(12) United States Patent
Cornelius

(10) Patent No.: US 10,774,885 B2
(45) Date of Patent: Sep. 15, 2020

(54) CLUTCH DEVICE AND SWITCHING DEVICE

(71) Applicant: VOLKSWAGEN AKTIENGESELLSCHAFT, Wolfsburg (DE)

(72) Inventor: Volker Cornelius, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 248 days.

(21) Appl. No.: 15/781,736

(22) PCT Filed: Dec. 8, 2016

(86) PCT No.: PCT/EP2016/080329
§ 371 (c)(1),
(2) Date: Jun. 6, 2018

(87) PCT Pub. No.: WO2017/097935
PCT Pub. Date: Jun. 15, 2017

(65) Prior Publication Data
US 2018/0347645 A1    Dec. 6, 2018

(30) Foreign Application Priority Data

Dec. 10, 2015 (DE) .......................... 10 2015 224 908

(51) Int. Cl.
*F16D 41/20* (2006.01)
*F02B 75/04* (2006.01)
(Continued)

(52) U.S. Cl.
CPC .......... *F16D 41/206* (2013.01); *F02B 75/045* (2013.01); *F16D 41/20* (2013.01); *F16D 43/02* (2013.01); *F16D 43/22* (2013.01)

(58) Field of Classification Search
CPC ........ F16D 41/20; F16D 41/206; F16D 43/02; F16D 43/22; F02B 75/045
See application file for complete search history.

(56) References Cited

U.S. PATENT DOCUMENTS

| 5,146,879 A | 9/1992 | Kume et al. |
|---|---|---|
| 6,394,247 B1 | 5/2002 | Monahan et al. |

(Continued)

FOREIGN PATENT DOCUMENTS

| CN | 101563517 A | 10/2009 |
|---|---|---|
| CN | 101636595 A | 1/2010 |

(Continued)

*Primary Examiner* — Huan Le
(74) *Attorney, Agent, or Firm* — Laurence A. Greenberg; Werner H. Stemer; Ralph E. Locher

(57) ABSTRACT

A clutch device transmits a torque between a rotatable drive-input element and a rotatable drive-output element. Upon demand, the elements are coupled in non-positively locking fashion by a clutch element. Each of the drive-input element and the drive-output element form one clutch surface. A clutch gap decreases in a radial direction relative to at least one axis of rotation of the elements. The clutch element can be placed into a first position and into a second position which differ with regard to the radial position within the clutch gap and thus with regard to the contact pressure between the clutch element and the clutch surfaces. The clutch device permits an axial arrangement of its components, namely, the drive-input element, the clutch elements and the drive-output element, that keeps the size of a clutch device small in a radial direction relative to the axes of rotation.

15 Claims, 11 Drawing Sheets

(51) Int. Cl.
*F16D 43/02* (2006.01)
*F16D 43/22* (2006.01)

(56) References Cited

U.S. PATENT DOCUMENTS

| | | |
|---|---|---|
| 2009/0266672 A1 | 10/2009 | Scheck |
| 2010/0078284 A1 | 4/2010 | Nilsson et al. |
| 2010/0320053 A1 | 12/2010 | Goeke et al. |
| 2013/0037370 A1* | 2/2013 | Marion .................. F16H 55/36 |
| | | 192/55.5 |
| 2013/0237351 A1* | 9/2013 | Marion .................. B60K 25/02 |
| | | 474/70 |
| 2013/0313060 A1* | 11/2013 | Takada .................. F16D 41/203 |
| | | 192/46 |
| 2017/0268422 A1 | 9/2017 | Popp et al. |

FOREIGN PATENT DOCUMENTS

| | | |
|---|---|---|
| CN | 101929510 A | 12/2010 |
| CN | 102537127 A | 7/2012 |
| DE | 4232191 C1 | 4/1994 |
| DE | 9313182 U1 | 10/1994 |
| DE | 69108572 T2 | 8/1995 |
| DE | 19907483 A1 | 8/2000 |
| DE | 10243023 A1 | 3/2004 |
| DE | 102004053225 A1 | 5/2006 |
| DE | 102009009528 A1 | 8/2010 |
| DE | 102014216532 A1 | 2/2016 |
| DE | 102014216533 A1 | 2/2016 |
| JP | H11294210 A | 10/1999 |

* cited by examiner

CLUTCH DEVICE AND SWITCHING
DEVICE

BACKGROUND OF THE INVENTION

Field of the Invention

The invention relates to a clutch device for the demand-actuated transmission of a torque between a drive element, which is rotatable about an axis of rotation, and a driven element, which is rotatable about an axis of rotation, which elements may be coupled with friction by means of a clutch element. The invention furthermore relates to a shift device having one or more clutch devices, by means of which a first element and a second element may be positioned in one or more rotational alignments relative to one another.

DE 199 07 483 A1 discloses an adjusting device, for example for a window winder or a seat adjustment in a motor vehicle, which enables a torque exerted on a drive element to be transmitted to a driven element in the two possible directions of rotation whilst, on the other hand, the transmission of a torque starting from the driven element to the drive element is prevented by means of a wrap spring which acts with friction on the inner side of a conically tapering housing by means of its outer side. The wrap spring therefore blocks a rotational movement of both the driven element and the driven element when the driven element is loaded by a torque, whilst it contracts when the drive element is loaded by a torque and is therefore wound more tightly, whereby the contact pressure between it and the inner side of the housing is reduced and the blocking action is lifted. The adjusting device is therefore intended to enable active adjustment of a seat back in a motor vehicle, for example, whilst simultaneously preventing automatic adjustment resulting from a force effect on the seat back.

U.S. Pat. No. 6,394,247 B1 discloses a V-belt drive of an internal combustion engine, wherein a wrap spring clutch is arranged between a pulley and the drive shaft of an accessory to be driven, for example a generator, which wrap spring clutch, acting radially and with friction, ensures the transmission of a torque from the pulley to the drive shaft, whereas, in the reverse case, the said wrap spring clutch opens and therefore prevents the transmission of a torque from the drive shaft of the accessory to the pulley. In particular, the aim is thus to achieve that, in the event of a sudden removal of the load following the operation of the internal combustion engine at relatively high rotational speeds of the crankshaft and therefore also the drive shaft of the accessory, an inertia-related overspeed of the drive shaft of the accessory is transmitted to the associated pulley, which, in conjunction with the braking effect on the rotational speed of the crankshaft owing to the removal of the load, could otherwise lead to increased slip between the V-belt and the pulley of the accessory.

A wrap spring clutch such as that known for example from U.S. Pat. No. 6,394,247 B1 represents a constructively simple and simultaneously operationally reliable clutch device acting with friction. However, the disadvantage with this is the relatively large installation space which it requires owing to its radial mode of action in the radial direction with respect to the axes of rotation of the drive and driven elements which may be coupled thereby.

SUMMARY OF THE INVENTION

Starting with this prior art, the object on which the invention is based is to specify a clutch device acting with friction, which is designed in a constructively simple manner and, compared to a conventional wrap spring clutch, requires less installation space in the radial direction with respect to the axes of rotation of the drive and driven elements which may be coupled thereby.

This object is achieved by means of a clutch device as claimed. A shift device comprising at least one clutch device according to the invention is the subject matter a further claim. Advantageous configurations of the clutch device according to the invention and/or the shift device according to the invention are the subject matters of the further claims and are revealed in the following description of the invention.

An inventive clutch device for the demand-actuated transmission of a torque between a drive element, which is rotatable about an axis of rotation, and a driven element, which is rotatable about an axis of rotation (which can be aligned in particular coaxially to the axis of rotation of the drive element), for which purpose these elements may be coupled with friction by means of a clutch element, is characterized in that the drive element and the driven element each form a clutch surface which form a clutch gap with a gap width which decreases in a radial direction with respect to at least one of the axes of rotation, wherein the clutch element may be brought into a first position and a second position which differ in terms of the radial position within the clutch gap and therefore in terms of the contact pressure between the clutch element and the clutch surfaces. Such a clutch device is therefore actuated radially, but acts primarily in the axial direction, i.e. the normally directed pressure forces which induce friction in the contacting clutch surfaces are aligned at least more in the axial direction with respect to the axes of rotation of the drive and driven elements than radially thereto.

A clutch device according to the invention essentially enables an (also exclusive) axial arrangement of the (main) components from which it is formed, i.e. the drive element, the clutch element(s) and the driven element, whereby the size of such a clutch device, at least in the radial direction with respect to the axes of rotation, can be kept small. At the same time, such a clutch device can be designed in a constructively very simple manner, yet still ensure reliable functionality.

It can preferably be provided that the first position of the clutch element is characterized by a relatively high contact pressure and the second position is characterized by a relatively low contact pressure. It can furthermore preferably be provided that the contact pressure in one (in particular the first) of the positions of the clutch element is high enough to establish substantially slip-free driving of the driven element by the drive element. It can likewise preferably be provided that the contact pressure in the other (in particular the second) of the positions of the clutch element is as low as possible, and in particular substantially zero, so that, when the clutch device is open, friction losses resulting from a contacting relative movement between the clutch surfaces of the drive and driven element on the one hand and the clutch element on the other are advantageously prevented to the greatest extent possible.

In a preferred configuration, it can be provided that the clutch device according to the invention has means for resilient loading of the clutch element. It can thus be achieved that the clutch element moves into a starting position, or can be held in such a starting position, automatically or as a result of a resilient loading, wherein this starting position can correspond both to a partially or fully closed state of the clutch device and to a (fully) open state of the clutch device. In a partially closed state, the transmission of a torque and therefore a rotational movement between the drive element and the driven element takes place with intended slip, whilst such an intended slip is not provided in the fully closed state. On the other hand, in the (fully) open state of the clutch device, there is substantially no transmission of a torque and therefore a rotational movement between the drive element and the driven element. The means for the resilient loading of the clutch element can be a separate spring element, for example. This means can likewise be the clutch element itself, which is designed accordingly to be resiliently deflectable.

In a furthermore preferred configuration, it can be provided that the clutch device acting with friction is designed to be self-energizing so that friction forces, which act between the clutch surfaces of the drive element and the driven element on the one hand and the clutch element on the other as a result of an initial load, induce a further movement of the clutch element into the narrowing clutch gap, in particular due to geometrical reasons, which is linked to a corresponding increase in the contact pressure. By means of such a clutch device, it is possible, with a relatively low initial load, to generate relatively high friction forces which are in particular self-energizing up to a slip-free coupling. The initial load for the clutch element of such a clutch device can be produced in particular by a resilient loading of the clutch element.

Alternatively or additionally, this can also be produced as a result of inertial forces (in particular gravitational and/or centrifugal forces). It can likewise be provided for this initial load to be actively applied by means of an actuator.

In one configuration of the clutch device according to the invention, it can be provided that the clutch element assumes the first position (which preferably corresponds to an at least partially closed state of the clutch device) in the state in which it is not resiliently loaded or as a result of a constructive resilient loading, whilst the second position (which preferably corresponds to an open state of the clutch device) is established as a result of overspeed. Such a clutch device can therefore open or close in particular automatically depending on the direction of a provided power flow, so that the driven element can be driven by the drive element as a result of a clutch element coupling these with friction, whilst (unintended) driving of the drive element by the driven element due to a rotational speed of the driven element being in particular temporarily higher than that of the drive element can be prevented by a movement of the clutch element into an open position.

A "constructive resilient loading" refers to the prestressing of a spring element loading the clutch element or of the automatically resiliently deflected clutch element which is established without an active influence on the spring element or the clutch element as a result of a constructive integration in the clutch device by supporting two portions (in particular end portions) of the spring element on elements of the clutch device.

In a further preferred configuration of a clutch device according to the invention, it can also be provided that the clutch element assumes the first position in the state in which it is not resiliently loaded or as a result of a constructive resilient loading, whilst the second position may be set, or is set, by means of an active setting device. Such a configuration enables flexible actuation of the clutch device, which may be fully controlled as necessary.

It can preferably be provided that the clutch surface(s) of the drive element and/or the driven element (and preferably also one or more clutch surfaces of the clutch element) are arranged at an angle with respect to that plane which is aligned radially to the axis/axes of rotation of the drive element and/or the driven element, which angle is ≤5° and preferably ca. 3°. In certain configurations of the clutch device, smaller angles can induce so great a self-inhibiting effect for the clutch element drawn further into the clutch gap as a result of the friction forces that the release of the clutch device is thus hindered. With too large an angle, on the other hand, relatively high radially so directed forces can be required to achieve the required contact pressure between the clutch surfaces of the drive element and the driven element and the clutch element.

It can furthermore preferably be provided that the setting device has an adjustable stop element for the clutch element. This can be designed such that it may be activated and deactivated, wherein it forms a stop for the clutch element in the activated state and does not form a stop for the clutch element in the deactivated state. To this end, it can particularly preferably be provided that, when the stop element is deactivated, the clutch element, owing to a state in which it is not resiliently loaded or a constructive resilient loading, is moved so far into the clutch gap that (possibly in conjunction with a self-energizing effect of the clutch device) the driven element is driven by the drive element whilst, when the stop element is activated, a portion of the clutch element which strikes said stop element as a result of a (still occurring) rotation of the driven element or the drive element results in this clutch element moving out of the narrowing clutch gap to the extent that the driven element is no longer driven by the drive element and, in particular, there is also substantially no longer any relevant friction between the clutch surfaces of the driven element and the drive element and the clutch element.

In a preferred configuration of the clutch device according to the invention, it can be provided that the clutch element forms clutch surfaces which are aligned parallel to the clutch surfaces of the drive element and the driven element. An advantageous frictional action between the respectively cooperating clutch surfaces can thus be achieved.

A shift device according to the invention, by means of which a first element and a second element may be positioned in at least one rotational alignment relative to one another, is characterized in that at least one clutch device according to the invention is provided, wherein the first element serves as a driven element of the clutch device which, when the clutch device is closed, may be rotated into the rotational alignment relative to the second element by the drive element of the clutch device, whilst the clutch device may be or is released (in particular automatically) when this rotational alignment is achieved.

Such a shift device can preferably furthermore comprise a locking element for a preferably form-fitting connection, securing the rotational alignment, between the first element and the second element A secured positioning or rotational alignment of the two elements relative to one another can thus be achieved, whilst the clutch device can ensure a functionally reliable and rapid rotation of the first element or driven element by means of the drive element when the locking element is not activated.

It can furthermore preferably be provided that the locking element (preferably acting with form fit) also serves as a stop element for the clutch device. A constructively advantageous dual function can therefore be realized for the locking element.

In a preferred configuration of an inventive shift device with an active setting device, at least two clutch devices can be provided, wherein the second (in particular released)

position of the clutch element of a first of the clutch devices may be set in a first rotational alignment of the (for both clutch devices identical) first element (or driven element) relative to the second element by means of the setting device and the second (in particular released) position of the clutch element of a second of the clutch devices may be set in a second rotational alignment of the first element (or driven element) relative to the second element by means of the setting device. Such a configuration can simplify the manner in which the driving of the driven element by the drive element in the at least two rotational alignments or out of these rotational alignments is induced or prevented and, in particular, enable a comparatively constructively simple configuration for a locking device (comprising the locking element(s)) and/or adjusting device of the shift device.

In particular, it can thus also be enabled that a locking element (optionally serving as a stop element) of the first clutch device, by means of which the first element (or driven element) may be locked in a first rotational alignment relative to the second element, and a locking element (optionally serving as a stop element) of the second clutch device, by means of which the first element (or driven element) may be locked in a second rotational alignment relative to the second element, may be actuated alternately by means of a common actuating element.

In one configuration of the internal combustion engine according to the invention, it can also be provided that the actuating element additionally serves as a stop element of the clutch devices, by means of which the clutch elements can preferably be moved into the position which corresponds to a released state of the associated clutch device in each case. This dual function of the actuating element can result in a relatively simple constructive configuration of the shift device according to the invention.

In particular to realize as secure a locking as possible of the first element in one of the rotational alignments relative to the second element, it can be provided that the actuating element may be positionally secured in at least two actuating end positions by means of a securing detent. In this case, this securing detent is preferably designed such that it may be released under an active effect aimed at switching the actuating element solely by means of a force effect, although forces are required for this which do not act on the actuating element in the corresponding direction in normal operation of a device comprising the shift device.

A shift device according to the invention can furthermore preferably be characterized in that
in the first rotational alignment of the first element (or driven element) relative to the second element, in which the second position of the clutch element of the first clutch device is set by means of a setting device, the second position of the clutch element of the second clutch device is set by means of a passive setting element and,
in the second rotational alignment of the first element (or driven element) relative to the second element, in which the second position of the clutch element of the second clutch device is set by means of the setting device, the second position of the clutch element of the first clutch device is set by means of a passive setting element.

It is thus in particular enabled that, in each of the rotational alignments of the first element (or driven element) relative to the second element, only one of the clutch devices has to be actively influenced for it to be held open or to be closed, whilst the other clutch device is automatically held open by the passive setting element solely as result of the respective rotational alignment of the first element (or driven element). If the clutch device which is actively influenced in the respective rotational alignment is then closed, the driving of the first element (or driven element) induced by this clutch device can result in the passive setting element, which is held open by the other clutch device, being overcome so that both clutch devices then ensure the driving of the first element (or driven element) by the drive element until the corresponding other rotational alignment is achieved. The clutch device which was previously held open by means of the passive setting element can then be actively influenced whilst the clutch device which was previously actively influenced can be held open automatically by the associated passive setting element.

It can furthermore be provided that
in the first rotational alignment of the first element (or driven element) relative to the second element, the locking element of the second clutch device is held in a release position by means of the actuating element, whilst the locking element of the first clutch device is loaded in a locking position by means of a spring element supported between the locking elements and,
in the second rotational alignment of the first element (or driven element) relative to the second element, the locking element of the first clutch device is held in a release position by means of the actuating element, whilst the locking element of the second clutch device is loaded in a locking position by means of the spring element.

It is thus possible to achieve a constructively advantageous configuration for the actuating element provided for actuating both locking elements.

It can furthermore be provided for a shift device according to the invention that the locking elements(s) (which are preferably displaceably mounted on the second element) is/are movable into a (respective) locking depression of the second element or (preferably) the first element, wherein, with respect to a revolving path of the locking element, on which this revolves relative to the component forming the locking depression(s) upon a relative rotation between the first element and the second element, the locking depression(s) has/have a greater dimension than that part of the locking element(s) which is provided for engaging in the locking depression(s). In this case, the term "locking depression" is intended to also include a through opening in which a locking element or at least a part thereof can engage to form a locking mechanism acting with form fit. Such a locking depression, which is relatively large with respect to the revolving path of the locking element, can ensure secure engagement of the locking element, even at high relative angular speeds between the locking element and the component forming the locking depression.

When the blocking element engages in the locking depression, to preferably prevent or restrict any movability between the locking element or the component (in particular the second element) supporting the locking element and the component (in particular the first element) forming the locking depression in spite of such a relatively large locking depression, it is furthermore preferably possible to provide a return blocking element which, together with the locking element, can engage in the locking depression and can thus at least partially fill that portion of the locking depression in which the locking element is not arranged after engaging in the locking depression.

To achieve an automatic function of the return blocking element, it can be provided that this is preferably designed to be chamfered on the side facing the locking element in such a way that it can be moved out of the locking depression as a result of contact with the edge of the locking depression, wherein this movement out of the locking depression furthermore preferably results in an (increasing) prestressing of a spring element. This prestressing of the spring element can then ensure renewed engagement of the return blocking element in the/a locking depression when it, or another locking depression, is again in a position corresponding to the return blocking element as a result of a rotation of the first element relative to the second element.

The indefinite article ("a") in particular in the claims and in the description explaining the claims in general is to be understood as such and not as a quantifier. Correspondingly, specified components are therefore to be understood such that they are present at least once and can be present a plurality of times.

BRIEF DESCRIPTION OF THE SEVERAL VIEWS OF THE DRAWING

The present invention is explained in more detail below with reference to exemplary embodiments illustrated in the drawings. The drawings show.

DESCRIPTION OF THE INVENTION

FIGS. 1 to 13 show an internal combustion engine, which is for example an Otto or diesel engine, with a shift device according to the invention in a first embodiment. According to FIG. 1, the internal combustion engine comprises an engine block 10, within which one or more cylinders 12 are formed. A cylinder head (not illustrated) adjoins the engine block 10 at the upper end thereof (in FIG. 1), whilst the lower end of the engine block 10 is provided for connection to an oil pan (likewise not illustrated). A crankshaft chamber 16 receiving a crankshaft 14 of the internal combustion engine would then be designed such that it is substantially completely closed.

Figure 2:
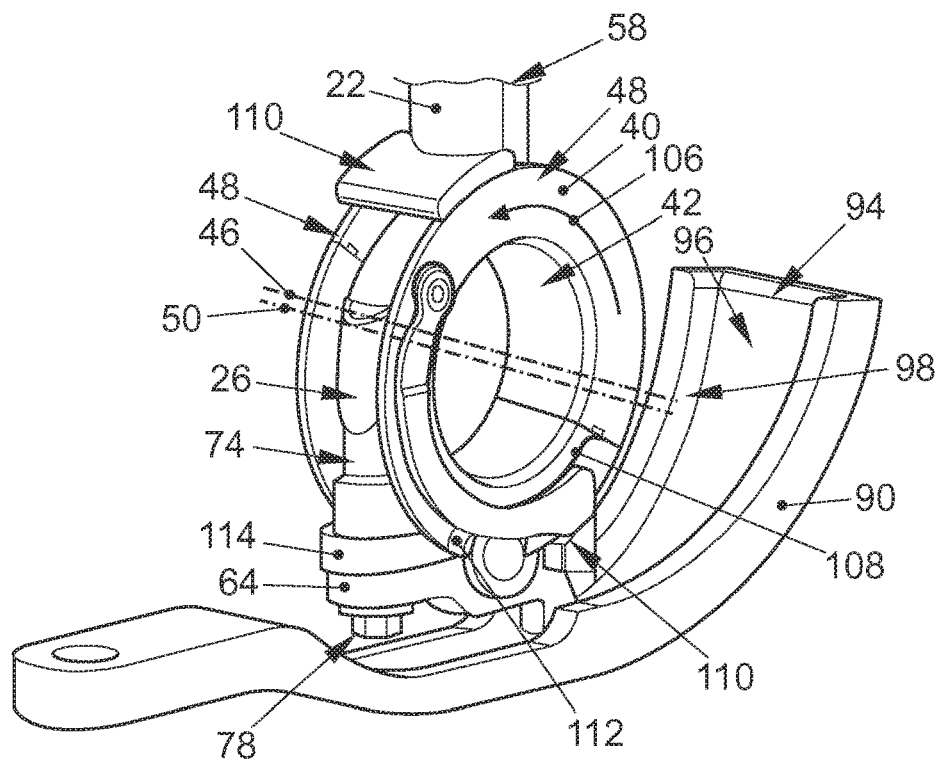
FIG. 2 in an isolated illustration, parts of the shift device and adjoining components of the internal combustion engine in a perspective view.
Figure 15:
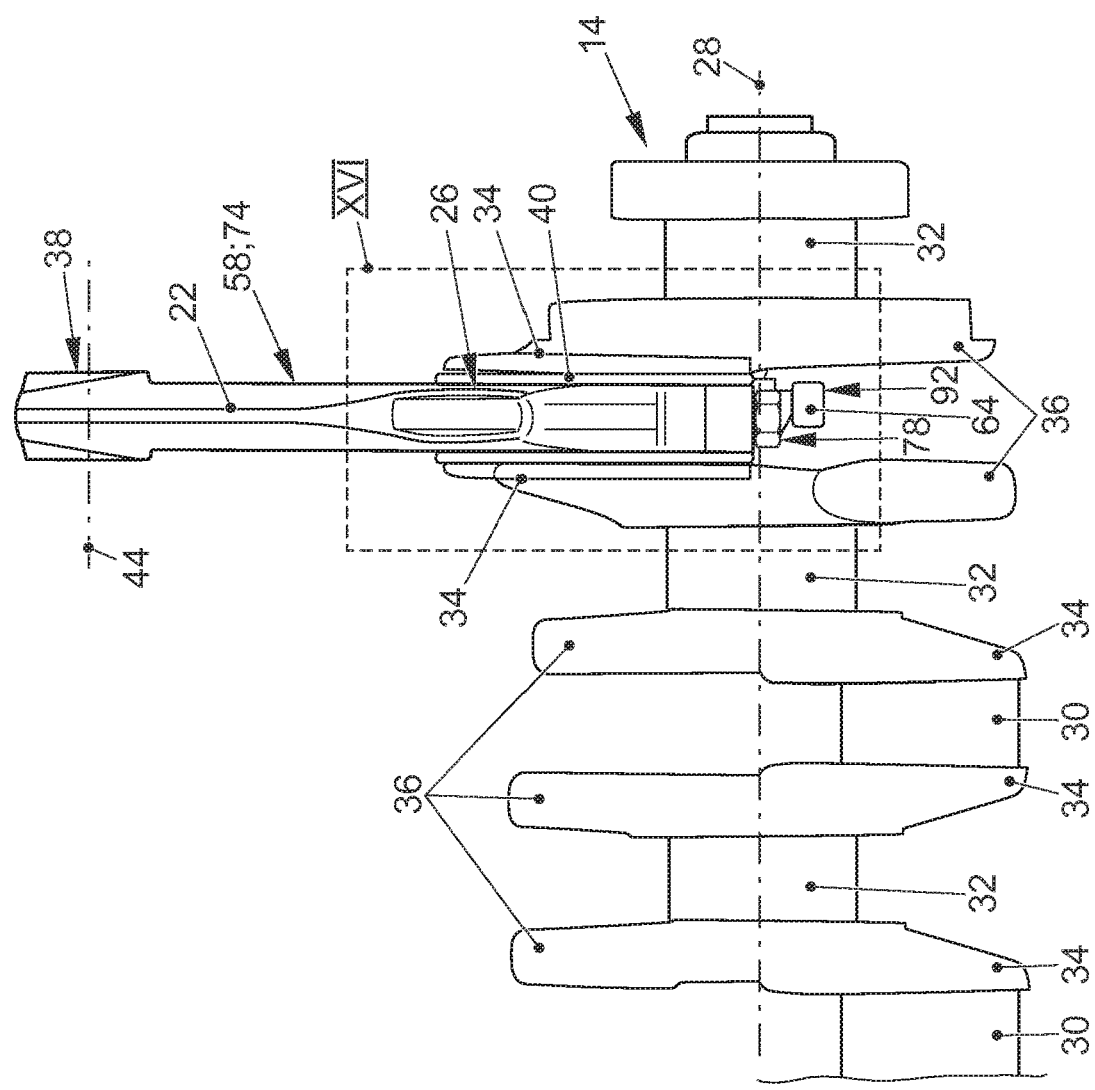
FIG. 15 the crank drive of the internal combustion engine according to FIG. 14 in a side view.

A piston 18 is mounted to be axially movable (with respect to a longitudinal axis 20 of the cylinder 12 and the piston 18) within the (or each) cylinder 12. An upper side of the piston 18, the so-called piston head, delimits, with the cylinder head, a combustion chamber in which, for working purposes, a fuel/unburned gas mix is combusted during a power stroke during operation of the internal combustion engine. An increase in pressure within the combustion chamber as a result of the combustion leads in a known manner to a downwardly directed movement of the piston 18, which, by means of a connecting rod 22, is converted into a rotational movement of the crankshaft 14 which is rotatably mounted within the engine block 10. To this end, the upper end of the connecting rod 22 is pivotably mounted on the piston 18, for which purpose the connecting rod 22 forms a first so-called connecting-rod small end 38 (c.f. FIG. 15) which receives a piston pin 24 of the piston 18 in a rotatable manner. Furthermore, the lower end of the connecting rod 22 is rotatably mounted on a crank pin 30 (c.f. in particular FIG. 15) by means of a so-called connecting-rod big end 26 (c.f. FIG. 2, for example) which is likewise formed at the lower end of the connecting rod, which crank pin is arranged decentrally with respect to an axis of rotation 28 of the crankshaft 14, so that the pressure forces which act on the piston head and are transmitted to the crank pin 30 via the connecting rod 22 generate a torque about the axis of rotation 28 of the crankshaft 14.

As is revealed in particular in FIG. 15, such a crankshaft 14 comprises cylindrical bearing portions 32 which are arranged coaxially with respect to the axis of rotation 28 of the crankshaft 14 and serve, on the one hand, for connecting adjacent crank pins 30 (in the case of a multi-cylinder internal combustion engine) to one another and, on the other, at least in part for rotatably mounting the crankshaft 14 within the engine block 10. The crank pins 30 which are rotatably mounted within the connecting-rod big ends 26 of the connecting rods 22 are delimited on both sides by disk-shaped portions of the crankshaft, which, on the one hand, form the so-called crank cheeks 34 which connect the crank pins 30 to the bearing portions 32 and, on the other, form the compensating masses 36 radially opposing the crank cheeks 34 with respect to the axis of rotation 28, whereby inertial forces and inertial torques during the rotation of the crankshaft 14 should be prevented to the greatest extent possible.

To enable the compression ratio during the operation of the internal combustion engine, i.e. the ratio of the volume of the combustion chamber in the lower dead point of the piston 18 to the volume in the upper dead point of the piston 18, to be altered in two stages, it is provided to mount the crank pin(s) 30 within the connecting-rod big end(s) 26 with the interconnection of a (respective) eccentric sleeve 40. The (each) eccentric sleeve 40 comprises a tubular bearing portion 42, whereof the cylindrical inner surface serves as a sliding surface for the rotational bearing of the crank pin 30 received therein and whereof the cylindrical outer surface serves as a sliding surface for the rotational bearing of the eccentric sleeve 40 within the connecting-rod big end 26 of the associated connecting rod 22. In this case, the inner and the outer surface of the bearing portion 42 are not coaxial but are offset radially from one another by a defined distance, whereby the spacing between the pivot axis or the axis of rotation 44 of the connecting-rod small end from the axis of rotation 46 of the cylindrical inner surface of the eccentric sleeve 40, and therefore the spacing between the piston 18 and the associated crank pin 30, changes depending on the rotational alignment of the eccentric sleeve 40 within the connecting-rod big end 26.

The tubular bearing portion 42 of the eccentric sleeve 40 merges at the two longitudinal axial ends into a respective delimiting portion 48, which is formed in each case by an annular disk which, starting from the bearing portion 42, extends radially outwards and thus delimits a movability of the eccentric sleeve 40 within the connecting-rod big end 26 in the axial direction with respect to the longitudinal axis 50 of the connecting-rod big end 26.

By means of a locking device 52 (as part of a shift device according to the invention), the rotatability of the eccentric sleeve 40 (first element or driven element of the shift device according to the invention) within the connecting-rod big end 26 of the connecting rod 22 (second element of the shift device according to the invention) may be locked in two defined rotational alignments, wherein, in the present exemplary embodiment, it is provided that the two rotational alignments correspond to the smallest and the largest spacing between the piston 18 and the associated crank pin 30.

As is revealed in particular in FIGS. 8 to 11, the locking device 52 comprises two mutually coaxially aligned locking elements 56 displaceably arranged within a cylindrical receiving opening 54 of the connecting rod 22. In this case, the receiving opening 54 is arranged on the outermost end (forming the connecting-rod big end 26) of the connecting rod 22 and therefore positioned as an extension of a connecting-rod shaft 58 of the connecting rod 22. In this case, it can be provided in particular that the longitudinal axis 60 of the connecting rod 22 passes through the receiving opening 54 and in particular also crosses the longitudinal axis of the receiving opening 54. A prestressed spring element 62 in the form of a cylindrical helical spring is arranged between the two locking elements 56, which spring element loads the two locking elements 56 away from one another and therefore, in each case, in the direction of the associated end of the receiving opening 54 or in the direction of the delimiting portion 48, adjoining said receiving opening, of the eccentric sleeve 40.

The axial movability of the locking elements 56 within the receiving opening 54 is variably delimited depending on the position of an actuating element 64 of the shift device according to the invention. To this end, a respective driver projection 66 of the actuating element 64 illustrated in isolation in FIG. 13 engages in a circumferential driver groove 68 (with respect to the longitudinal axis of the receiving opening 54 or the movement axis of the locking elements 56) of the locking element 56, whereby, on the one hand, a movability of the locking elements 56 within the receiving opening 54 is delimited and, on the other, for altering the compression ratio in which the internal combustion engine can be operated, these locking elements can be displaced within the receiving opening 54 by switching the actuating element 64 between two possible actuating end positions of the actuating element 64.

Figure 7:
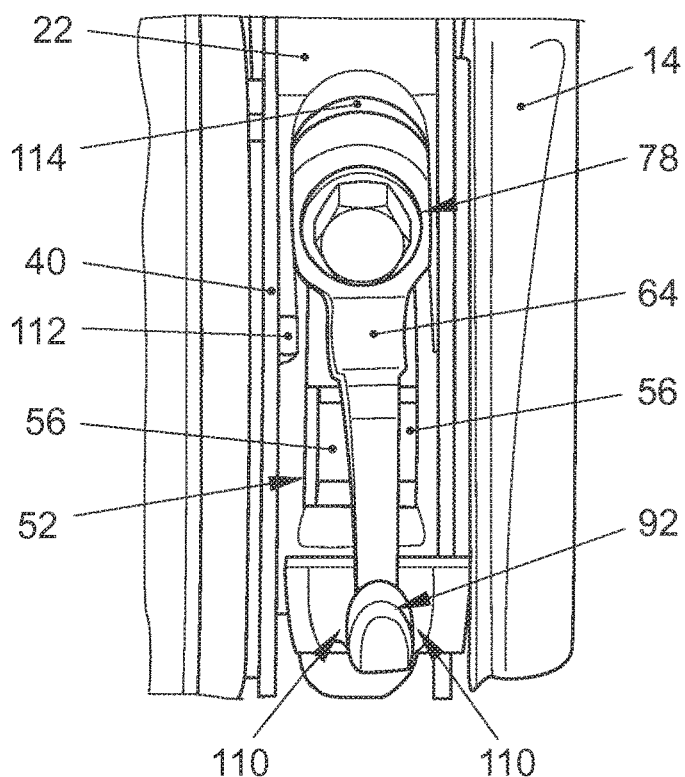
FIG. 7 in a detail, a view from below of the components according to FIGS. 4 to 6 with an actuating element of the shift device in a first position.
Figure 8:
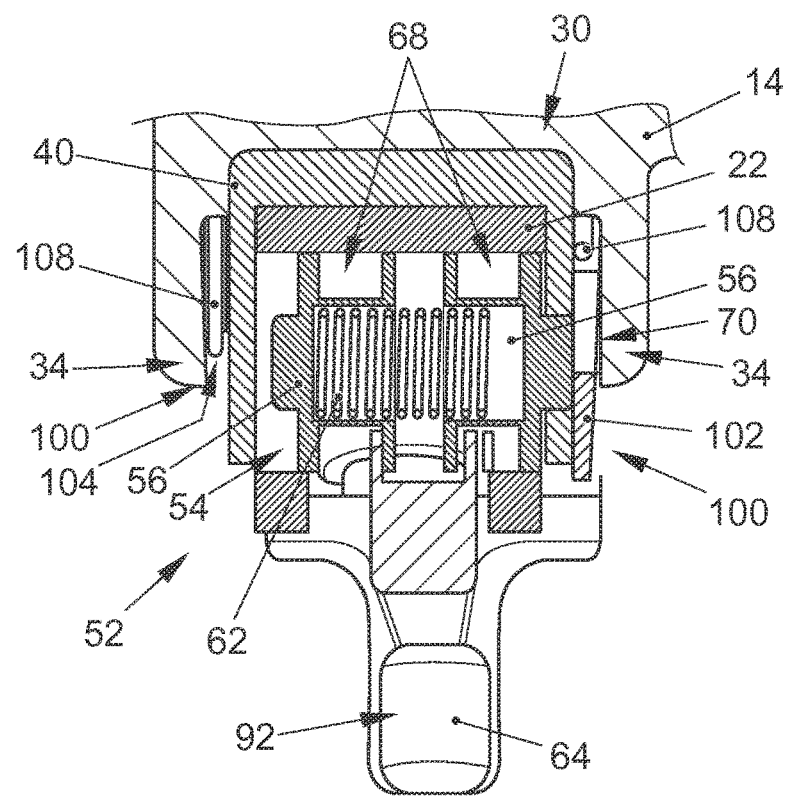
FIG. 8 a radial section through a portion of a crankshaft, a connecting rod, an eccentric sleeve, a setting and a locking device and two clutch devices of the internal combustion engine, wherein a first locking element of the locking device is in a locking position and a second locking element of the locking device is in a release position.
Figure 9:
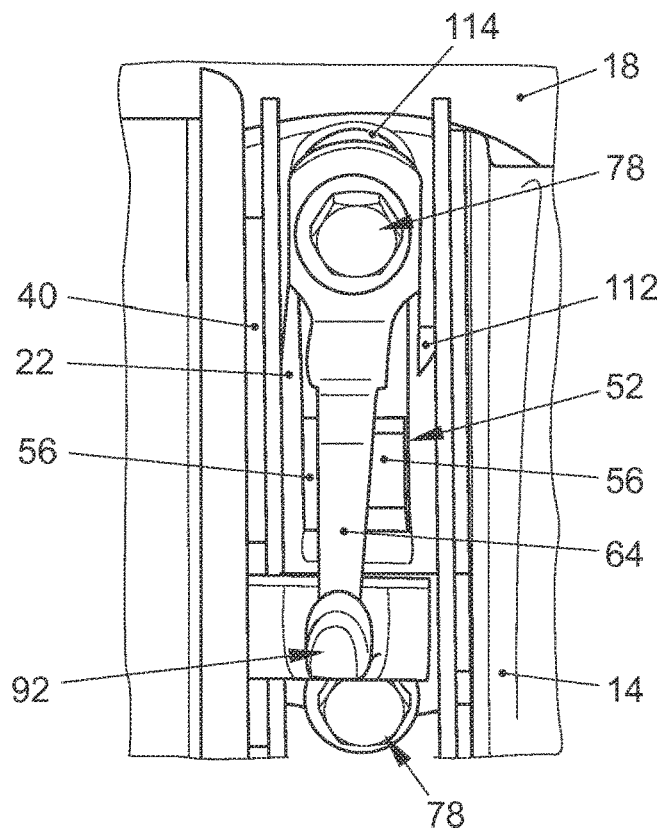
FIG. 9 a view according to FIG. 7 with the actuating element in a second position.
Figure 10:
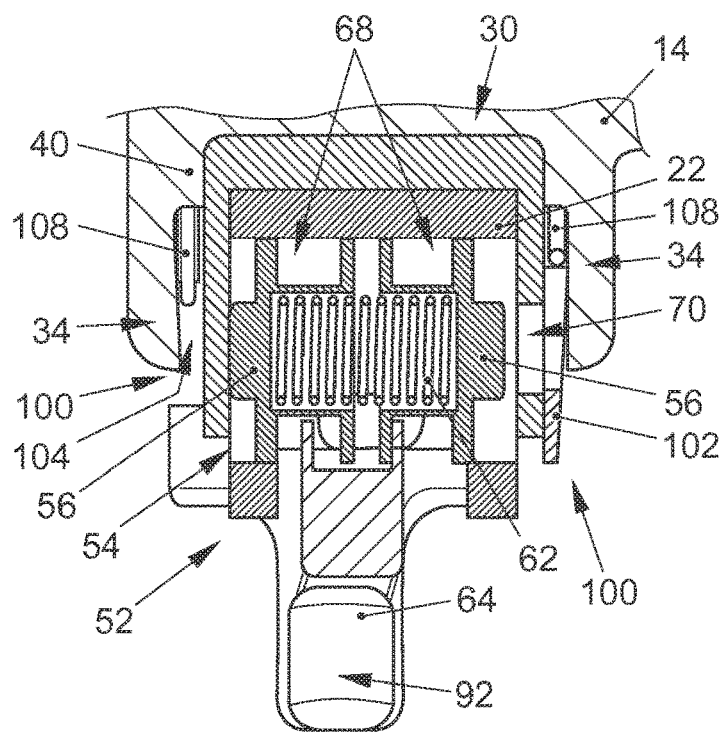
FIG. 10 a view according to FIG. 8, but wherein the first locking element is now in a release position and the second locking element is in an intermediate position.
Figure 11:
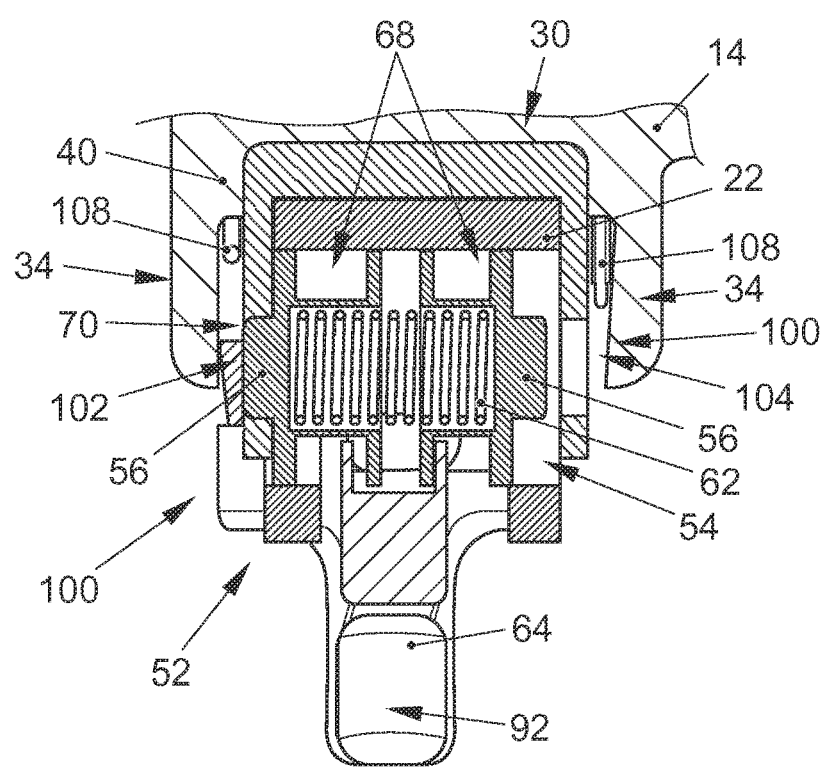
FIG. 11 a view according to FIG. 10, but wherein the second locking element is now in a locking position.

In this case, FIGS. 7 and 8 show the actuating element 64 in a first actuating end position, in which a first of the locking elements 56, which is illustrated on the right in FIGS. 8, 10 and 11, can moreover engage in a locking depression 70 designed as a through-opening (according to the configuration in FIGS. 7 to 11) or an edge recess (according to the configuration in FIGS. 1 to 6) in the associated delimiting portion 48 of the eccentric sleeve 40 if the eccentric sleeve 40 is located in the corresponding rotational alignment with respect to the connecting rod 22 or the connecting-rod big end 26. In contrast, FIGS. 9 and 11 show the actuating element 64 in the second actuating end position, in which the second of the locking elements 56, which is illustrated on the left in FIGS. 8, 10 and 11, can engage in such a locking depression 70 formed in the associated delimiting portion 48 of the eccentric sleeve 40 when the eccentric sleeve 40 is offset through ca. 180° with respect to the first-mentioned rotational alignment of the eccentric sleeve 40 (according to FIGS. 8 and 10). In these two rotational alignments of the eccentric sleeve 40, which may be locked by means of the locking device 52, the spacings between the piston 18 and the associated crank pin 30 differ as a result of the eccentric design of the eccentric sleeve 40. These different spacings can also be seen from a comparison of FIGS. 8 and 11, from which the different wall thicknesses of the tubular bearing portion 42 of the eccentric sleeve 40 in the portion between the crank pin 30 and that portion of the connecting rod 22 which receives the locking device 52 can be seen. In the rotational alignment according to FIG. 8, the wall thickness of the corresponding region of the bearing portion 42 of the eccentric sleeve 40 is greater than in the rotational alignment according to FIG. 11, whereby the spacing between the crank pin 30 and the piston 22 in the rotational alignment according to FIG. 8 is smaller than that in the rotational alignment according to FIG. 11.

FIG. 10 shows the positions of the locking elements 56 after the actuating element 64 has switched from the first actuating end position illustrated inter alia in FIG. 7 to the second actuating end position illustrated inter ala in FIG. 9, but still before the eccentric sleeve 40 has been rotated from the rotational alignment according to FIG. 8 into the rotational alignment according to FIG. 11. In FIG. 10, it is shown that the first locking element 56, illustrated on the right, is located in a release position in which it is arranged out of engagement with the associated locking depression 70 of the eccentric sleeve 40 and moreover at a defined spacing with respect to the associated delimiting portion 48 of the eccentric sleeve 40. A movement of the first locking element 56, illustrated on the right, starting from the locking position according to FIG. 8 into the release position according to FIG. 10 is achieved by a switching of the actuating element 64, starting from the first actuating end position according to FIG. 7 into the second actuating end position according to FIG. 9, wherein this is pivoted about a pivot axis 72. In this case, the corresponding driver projection 66 of the actuating element 64 drives the first locking element 56 as a result of contact with the corresponding inner delimiting wall of the driver groove 68 and displaces this locking element within the receiving opening 64 in the direction of its longitudinal axial center. The second locking element 56, illustrated on the left, is simultaneously in a position to move further in the direction towards the corresponding end of the receiving opening 64, wherein this movement is induced by the prestressing of the spring element 62 which is supported between the locking elements 56 and further prestressed by the movement of the first locking element 56 in the direction of the longitudinal axial center of the receiving opening 64. As long as the eccentric sleeve 40 has not yet been rotated into the second rotational alignment illustrated in FIG. 11, this movability of the second locking element 56 is delimited by contact with the inner side of the associated delimiting portion 48 of the eccentric sleeve 40. Only shortly prior to achieving the second rotational alignment can the second locking element 56 engage in the then correspondingly positioned associated locking depression 70 and therefore be moved into its locking position illustrated in FIG. 11.

Upon renewed switching of the actuating element 64, then from the second actuating end position illustrated inter alia in FIG. 9 into the first actuating end position illustrated inter alia in FIG. 7, the second locking element 56 is moved into the associated release position in the correspondingly reversed sequence and the first locking element 56 is freed, whereby this can in turn engage in the associated locking depression 70 as soon as the eccentric sleeve 40 has again been rotated through ca. 180° within the connecting-rod big end 26.

The connecting rod 22 comprises two parts screwed together, a connecting-rod base body 74 forming the connecting-rod small end 38, the connecting-rod shaft 58 and half of the connecting-rod big end 26 and a connecting-rod cover 76 forming the second half of the connecting-rod big end 26 and integrating the locking device 52. This two-part design of the connecting rod a 22 in the region of the connecting-rod big end 26 enables the connecting rod 22 to be connected to the corresponding bearing pin 30 of the single-part crankshaft 14 in the course of assembling the internal combustion engine. The separating plane between the connecting-rod base body 74 and the connecting-rod cover 76 extends perpendicularly with respect to the longitudinal axis 60 of the connecting rod 22 (or the connecting-rod shaft 58). The axis of rotation 50 of the eccentric sleeve 40 furthermore also extends within the connecting-rod big end 26 within this separating plane, whereby a radial alignment of this separating plane with respect to the connecting-rod big end 26 is produced. As can be seen in particular in FIG. 12, the screw of one of the screw connections 78 between the connecting-rod base body 74 and the connecting-rod cover 76 is used as a pivot pin for the actuating element 64. The pivot axis 72 about which the actuating element 64 may be pivoted to be moved back and forth between its two actuating end positions therefore corresponds to the longitudinal axis of the screw of this screw connection 78.

Figure 12:
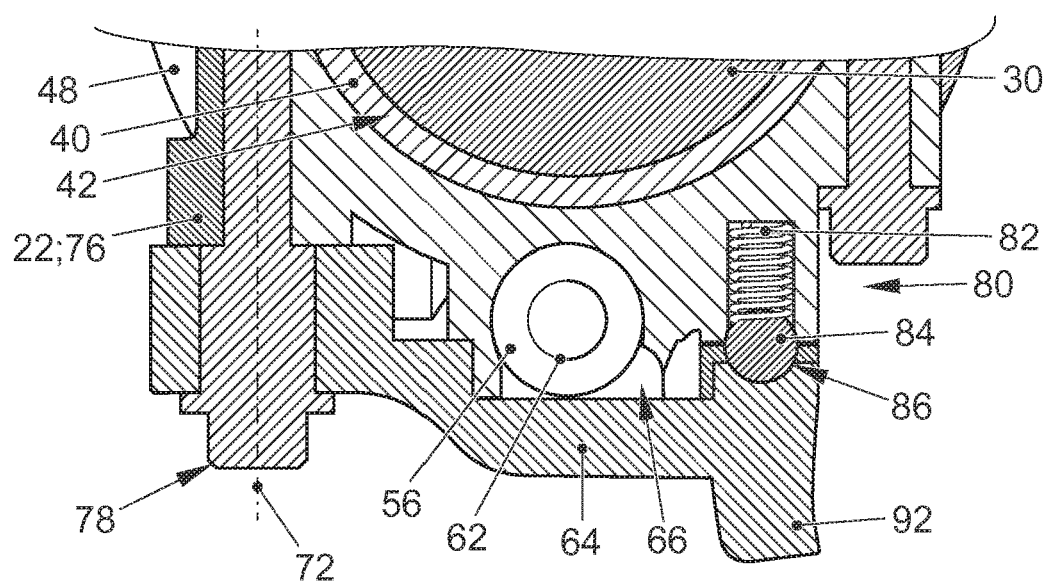
FIG. 12 a cross-section through the components according to FIGS. 7 to 11.
Figure 13:
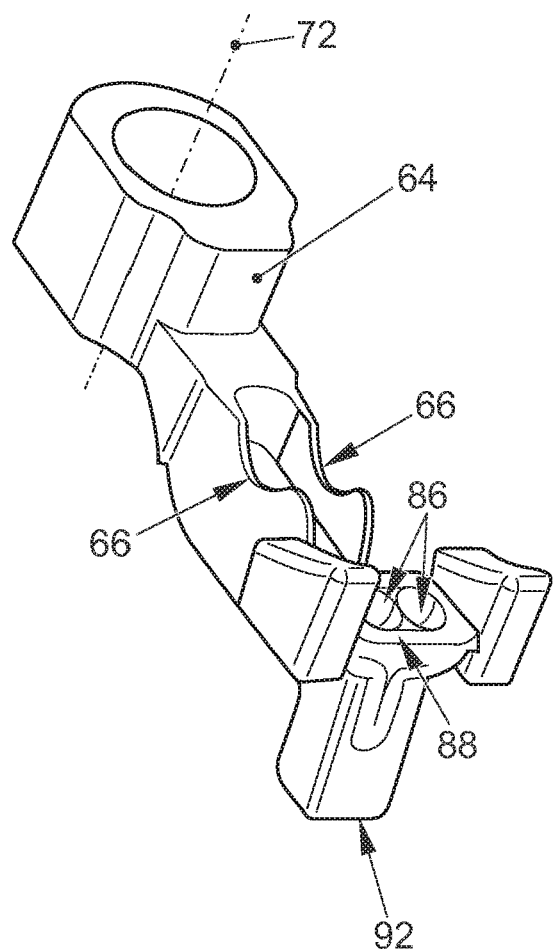
FIG. 13 in an isolated illustration, the actuating element of the internal combustion engine in a perspective view.
Figure 14:
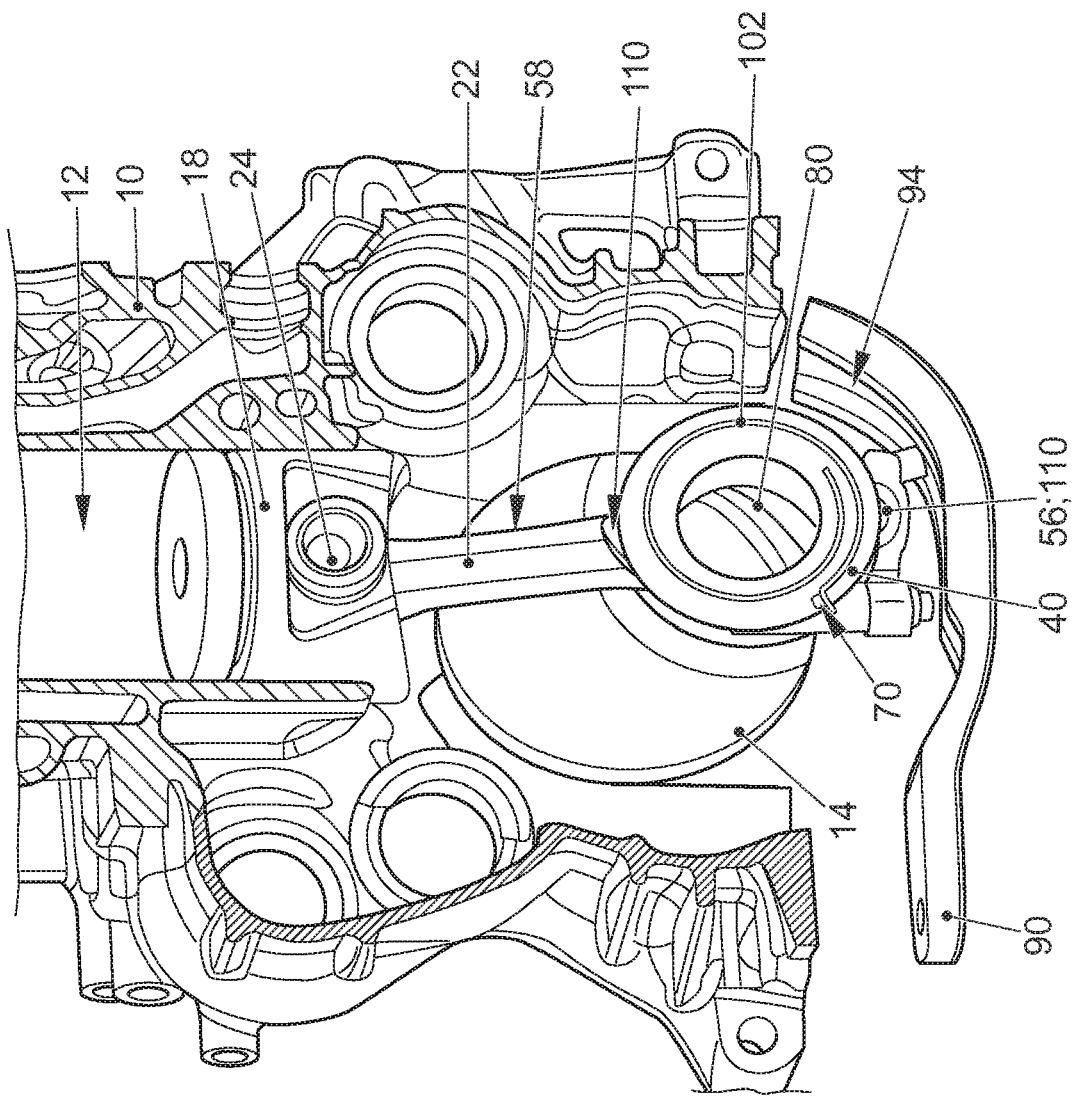
FIG. 14 a partial perspective cross-section through components of an internal combustion engine with a shift device according to the invention in a second embodiment.

The securing of the actuating element 64 in its two actuating end positions takes place by means of a securing detent 80 which, according to FIGS. 12 and 13, is formed by a detent ball 84, which, loaded by a spring element 82, is movably guided in a guide opening of the connecting rod 22 or the connecting-rod cover 76, in conjunction with one of two adjacently arranged shell-shaped detent depressions 86 integrated in the adjoining portion of the actuating element 64. When the actuating element 64 switches between its actuating end positions, the detent balls 84 have to be raised in each case under the further prestressing of the associated spring element 82 in order to overcome the web 88 arranged between the two detent depressions 86. To this end, a switching torque (about the pivot axis 72 of the actuating element 64) is required, which is not produced by forces which conventionally occur during operation of the internal combustion engine. An unintended automatic switching of the actuating element 64 can therefore be prevented by the securing detent 80. On the other hand, for switching purposes, it is merely necessary to apply a corresponding switching torque to the actuating element 64 without needing to release a locking mechanism acting with form fit.

Figure 1:
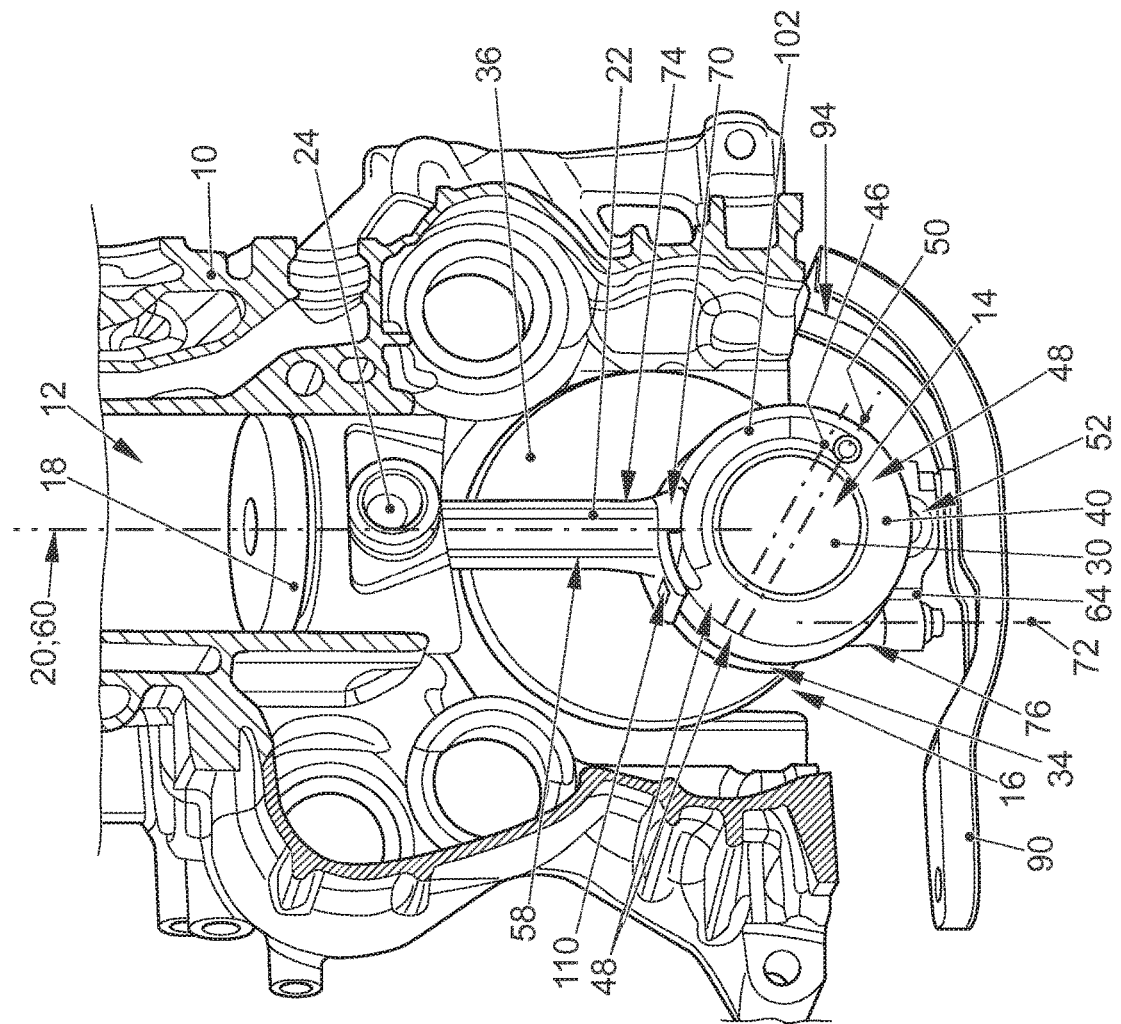
FIG. 1 a partial perspective cross-section through components of an internal combustion engine with a shift device according to the invention in a first embodiment.
Figure 3:
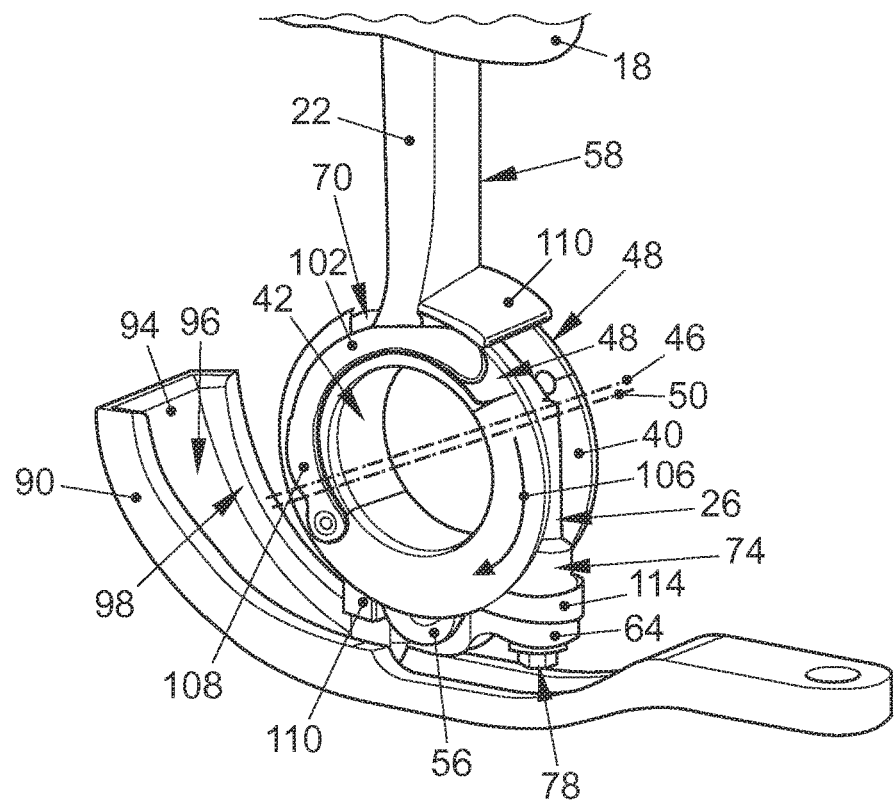
FIG. 3 the components according to FIG. 2 in a further perspective view.
Figure 5:
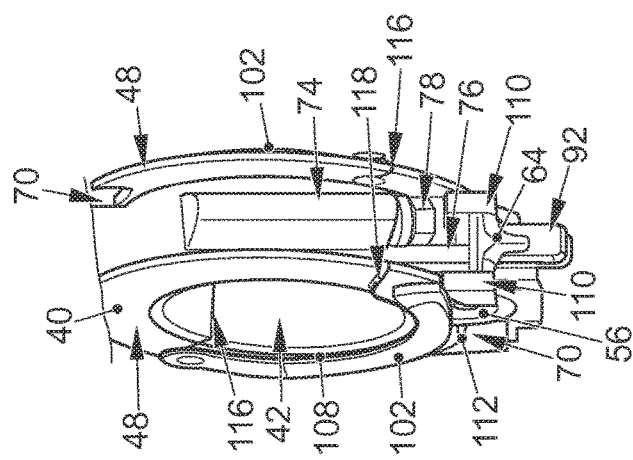
FIG. 5 the components according to FIG. 4 in a further perspective view.
Figure 4:
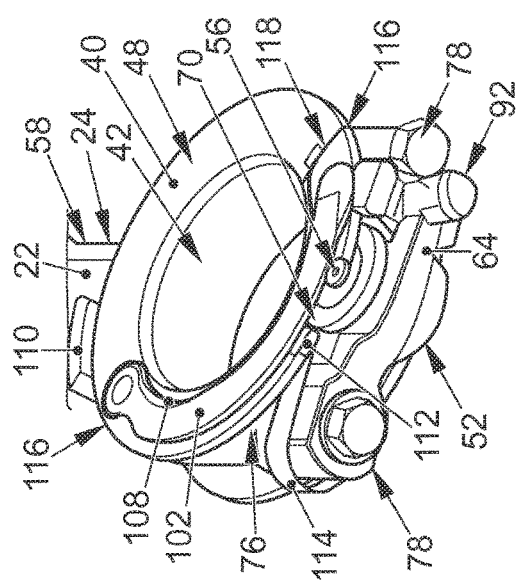
FIG. 4 the components according to FIGS. 2 and 3 (but without the actuating rail of the internal combustion engine) in further perspective view.
Figure 6:
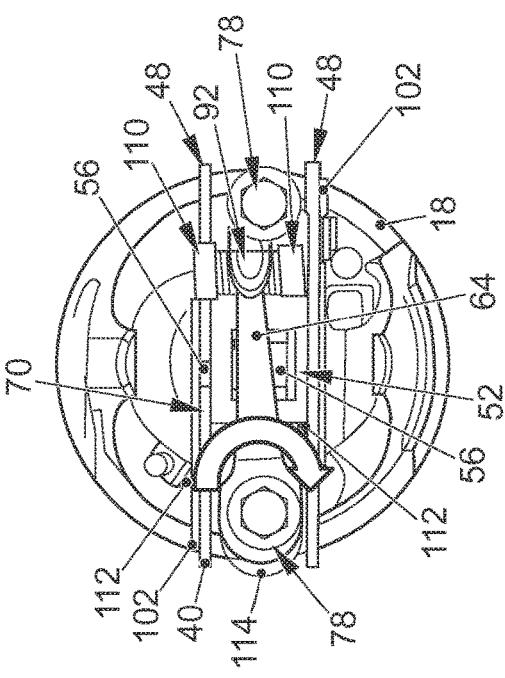
FIG. 6 the components according to FIGS. 4 and 5 in a further perspective view.

As is illustrated in FIGS. 1 to 3, the actuation of the actuating element 64 takes place by means of an actuating rail 90 which is pivotably fastened to the engine block 10. In this case, the actuating rail 90 in FIG. 1 is illustrated in the manner of an exploded illustration such that it is spaced from the connecting point on the engine block 10 and therefore from its actual functional position within the crankshaft chamber 16. In its actual functional position (c.f. FIGS. 2 and 3), the actuating rail 90 is located so close to the axis of rotation 28 of the crankshaft 14 that, in the position corresponding to the lower dead point of the piston 18 and at least over a defined angular region before this position is achieved, the actuating element 64 connected to the connecting rod 22 is arranged with a guide element 92 formed thereby inside a guide groove 94 formed by two side walls of the actuating rail. In this case, the width of the guide groove 94 decreases continuously starting from a run-in portion, i.e. that end at which the guide element 92 of the actuating element 64 enters the guide groove 94 in the course of each revolution of the crankshaft 14. The longitudinal extent of the actuating rail 90 is moreover adapted via a curved progression to the revolving path of the guide element 92 of the actuating element 64 which this describes as a result of a revolution of the crankshaft 14, so that it can be provided in particular that a spacing which is maintained by the underside of the guide element 92 with respect to the groove base 96 of the guide groove 94 of the actuating rail 90 remains substantially constant over the course of the movement of the guide element 92 within the guide groove 94. In this case, it is preferably moreover provided that the guide element 92 of the actuating element 64 does not contact the groove base 96 of the guide groove 94 at any time.

If the actuating element 64 is located in one of its actuating end positions and the actuating rail 90 is located in the associated functional position, the guide element 92 of the actuating element 64 is guided through the guide groove 94 during each revolution of the crankshaft 14 without contacting inner guide surfaces 98 of the guide rail 90 which are formed by the side walls of the actuating rail 90. It can be provided in particular that the guide element 92 is guided substantially precisely centrally between the two side waifs, at least at the end of the guide groove 94. If, on the other hand, starting from such a starting position, the actuating rail 90 is pivoted into the corresponding other functional position by means of an actuator (not illustrated) controlled by an engine control (likewise not illustrated) of the internal combustion engine, the guide element 92 of the actuating element 64, when it next enters the guide groove 94, contacts the guide surface 98, which has moved into the revolving path of the guide element 92 as a result of the actuation of the guide rail 90, so that the guide element 92 is guided along this guide surface 98 and the actuating element 64, as a result of the narrowing guide groove 94, is thereby moved or pivoted in the direction of its other actuating end position. In this case, the pivotal movement of the actuating element 64, which is induced by the contact with the corresponding guide surface 98, is only great enough for the detent ball 84 of the securing detent 80 to be moved over the web 88 formed between the two detent depressions 86. The last, relatively small portion of the pivotal movement of the latching element 64 into its then-provided actuating end position is achieved by the detent ball 84 latching in the corresponding detent depression 88. It can thus be realized that the guide element 92 of the actuating element 64 is still a short distance away from the guide surface 98 of the actuating rail 90 which induces switching and there is therefore no contact with this or the two side walls of the actuating rail 90 during subsequent operation of the internal combustion engine, which means that it is possible to prevent the friction losses and an increased noise level during operation of the internal combustion engine.

The guide surfaces 98 of the actuating rail 920 are designed to be curved in such a way that, after the switching of the actuating rail 90, the guide element 92 of the actuating element 64 runs onto the corresponding guide surface 98 in the tangential direction, whereby a switching of the actuating element 64 can be achieved with a force progression which increases in as constant a manner as possible. This can have an advantageous effect on the service life of the components involved and on the acoustic behavior of the internal combustion engine.

To enable reliable and rapid rotation of the eccentric sleeve 40 between the two rotational alignments which may be locked by the locking device 52 after the actuating element 64 has been pivoted from one of the actuating end positions into the other of the actuating end positions by means of the actuating rail 90, the inventive shift device of the internal combustion engine comprises two inventive clutch devices 100 acting with friction, by means of which the eccentric sleeve 40 (as a common driven element of the two clutch devices 100) may be temporarily coupled to the crankshaft 14 (as a common drive element of the two clutch devices 100) in order to rotate the eccentric sleeve 40 relative the connecting rod 22 or to the connecting-rod big end 26. Each of the clutch devices 100 comprises a sickle-shaped or part-ring-shaped clutch element 102, which is arranged on the outer side of one of the delimiting portions 48 of the eccentric sleeve 40 in each case and therefore in a clutch gap 104 formed between the eccentric sleeve 40 and the adjoining crank cheek 34 of the crankshaft 14. In this case, an end portion of the clutch element 102 is rotatably fastened in the associated delimiting portion 48 of the eccentric sleeve 40 and the clutch element 102, starting from this rotational bearing, extends in the direction of rotation 106 of the eccentric sleeve 40 which this latter adopts, relative to the associated crank cheeks 34, during operation of the internal combustion engine (and with locking in one of the rotational alignments) (c.f. FIGS. 2 and 3).

As revealed for example in FIGS. 8, 10 and 11, the gap width of the clutch gap 104 decreases outwards in the radial direction, which is achieved by a corresponding inclined position of the inner sides (facing the eccentric sleeve 40 and serving as clutch surfaces) of the crank cheeks 34 through an angle of ca. 3° with respect to an alignment which is achieved perpendicularly to the axis of rotation 50 of the eccentric sleeve 40 within the connecting-rod big end or to the axis of rotation 46 of the crank pin 30 within the eccentric sleeve 40. The cross-section of each of the clutch elements 102 is designed to be correspondingly tapered or wedge-shaped so that a parallel alignment of the a clutch surfaces of the clutch elements a two to the respectively adjacent adjacent clutch surfaces formed by the crank cheeks 34 is produced. By means of a prestressed spring element 108, the clutch elements 102 of both clutch devices 100 are each loaded in the radially outward direction, and therefore into the narrowing clutch gap 104. This spring-loading results in initial loads for the clutch devices 100, by means of which the clutch surfaces of the clutch elements 102 are pressed against the clutch surfaces of the crank cheeks 34 and the eccentric sleeve 40 (which are formed by the outer sides of the delimiting portions 48 of the eccentric sleeve 40). The initial loads generated in this way result in friction forces which are opposed to a relative movement between the eccentric sleeve 40 and the crank cheeks 34 and whereof the direction of action is such that they additionally induce a torque about the respective rotational bearing of the clutch elements 102 in the direction of a further outward pivotal movement and therefore an additional movement into the respective narrowing clutch gap 104. A self-energizing of the frictional actions of the clutch devices 100 is therefore achieved in the closed state in each case.

During operation of the internal combustion engine and when the eccentric sleeve 40 is locked in one of the rotational alignments, the clutch devices 100 are generally open in that, as a result of contact with a stop element 110 in each case, the clutch elements 102 are pivoted inwards under further prestressing of the respective spring element 108 to the extent that the friction produced between at least the clutch surfaces of the crank cheeks 34 and the clutch surfaces of the clutch elements 102, which are adjacent thereto, is as low as possible. In this case, that clutch element 102 which is rotatably mounted on that delimiting portion 48 of the eccentric sleeve 40 in which the associated locking element 56 engages in the locking depression 70 as a result of the correspondingly selected actuating end position of the actuating element 64, is deflected radially inwards in each case by means of an associated stop element 110 of the actuating element 64, whilst a deflection of the other clutch element 102 in each case takes place by means of a passive stop element 110.

If the actuating element 64 is now switched, the clutch element 102 which was previously held deflected by this is freed so that it pivots outwards as a result of the spring loading and therefore into the associated narrowing clutch gap 104, whereby at least the corresponding clutch device 100 is closed. This closed clutch device 100 then induces—initially on its own—a driving of the eccentric sleeve 40 with the crank cheeks 34 rotating relative to the connecting-rod big end 26. This driving action induces a release of the other clutch element 102 from the deflecting contact with the passive stop element 110, so that this clutch element 102 is subsequently also pressed into the narrowing clutch gap 104 as a result of the spring loading and this clutch device 100 is therefore also closed. For the remainder of the rotation of the eccentric sleeve 40 through 180° into the other rotational alignment, both clutch devices 100 then induce the frictional coupling of the eccentric sleeve 40 to the associated crank cheeks 34 of the crankshaft 14. Shortly prior to achieving the new rotational alignment of the eccentric sleeve 40, the other locking element 56, as already described with reference to FIGS. 10 and 11, then engages in the locking depression 70 of the associated delimiting portion of the eccentric sleeve 40 and the clutch elements 102 of both clutch devices 100 then run onto the corresponding stop elements 110, on the one hand onto the second stop element 110 of the actuating element 64, which is disengaged as a result of the switching of the actuating element 64, and, on the other, in turn onto the passive stop element 110 projecting over the eccentric sleeve 40 on both sides, whereby they are in turn pivoted inwards under renewed prestressing of the spring elements 108 and the clutch devices 100 are therefore released. The internal combustion engine can then be further operated with an altered compression ratio, wherein the eccentric sleeve 40 is locked in the new rotational alignment with respect to the connecting rod 22 and, as a result of the released clutch devices 100, is again rotatable relative to the crank cheeks 34, substantially without friction.

As a result of the high rotational speeds at which internal combustion engines, which are provided for example for driving motor vehicles, are operated, high differential (angular) speeds are produced between the eccentric sleeve 40, which is temporarily coupled to the crank cheeks 34 by means of the clutch devices 100, and the connecting rod 22 integrating the locking device 52. To ensure that the locking element 56, which is pressed in each case against the inner side of the associated delimiting portion 48 of the eccentric sleeve 40 in a spring-loaded manner during the change in the rotational alignment, latches reliably in spite of these high differential speeds, each of the locking depressions 70, with respect to a revolving path of the associated locking element 56 (when an eccentric sleeve 40 is rotating relative to the connecting rod 22), has a larger dimension than that part of the locking element 56 which is provided for engaging in the locking depression 70. To this end, the locking depressions 70 are designed as arcuately extending, elongated through-openings or recesses. The locking elements 56 can therefore engage in the associated locking depressions 70 not only in a precise rotational alignment but in a relatively large angular range so that this takes place with adequate reliability in spite of the relatively high differential speeds and in spite of the inertia with which the locking elements 56 are accelerated as a result of the spring loading in the direction of the associated locking depressions 70.

The larger dimensions of the locking depressions 70 in comparison to those parts of the locking elements 56 which engage therein essentially result in a (restricted) rotational movability between the eccentric sleeve 40 and the connecting-rod big end 26 in spite of a locking action by one of the locking elements 56. To eliminate this movability or at least reduce it as substantially as possible, a further passive return blocking element 112 fastened to the connecting rod 22 and specifically to the connecting-rod cover 76 is associated with each locking element 56, which passive return blocking element, when the associated locking element 56 engages in the front end (with respect to the direction of rotation 106 of the eccentric sleeve 40 relative to the crank cheeks 34) of the associated locking depression 70, likewise engages in this locking depression 70 in the region of the other end and, together with the locking element 56, therefore connects the eccentric sleeve 40 to the connecting rod 22 substantially without play. A moving-out of a return blocking element 112 engaging in a locking depression 70 when the associated locking element 56 has also been moved out of the associated locking depression 70 as a result of a switching of the actuating element 64 is automatically achieved in that the return blocking elements 112 are each designed with an inclined surface such that, upon contact with the edge of the respective locking depression 70, they can be deflected under further prestressing of an associated spring element 114 when a driving of the eccentric sleeve 40 by the crankshaft 14 is then induced. For constructively advantageous integration of the two return blocking elements 112 in the connecting rod 22, it is provided that these are each fastened to a free end of a leg of the spring element 114, which is designed in the form of a U-shaped leaf spring, and the spring element 114 is fastened to the actuating element in the region of its arcuate portion in which it is not deflected.

Like the connecting rod 22 in the region of the connecting-rod big end 26, the eccentric sleeve 40 is also formed from two parts or half-shells, wherein the separating plane 116 between these parts is preferably arranged such that the axis of rotation 46 of the crank pin 30 extends within the eccentric sleeve or the axis of rotation 50 of the eccentric sleeve 40 within the connecting-rod big end 26 extends within this separating plane 116. So that the assembly of the eccentric sleeve 40 is as advantageous as possible, it is furthermore provided that bearing openings (and in particular the longitudinal axes thereof), which serve as rotational bearings of the clutch elements 102 in the associated delimiting portions 48 of the eccentric sleeve 40, are likewise arranged in this separating plane 116. The same applies for radially aligned guide openings 188 (with respect to one of the axes of rotation 46, 50 of the eccentric sleeve 40) for the deflectable ends of the integrated spring elements 108 which are guided arcuately along the inner sides of the associated clutch elements 102 and are secured against rotation in the region of the rotational bearings of the clutch elements 102. A separate connection of the two parts of the eccentric sleeve 40 is not required because they are held together as a result of the arrangement within the connecting-rod big end 26.

The internal combustion engine, illustrated in FIGS. 14 to 17, with an inventive shift device in a second embodiment differs from a first embodiment according to FIGS. 1 to 13 substantially merely in terms of the configuration of the clutch devices 100 and the actively influenceable setting device for releasing the clutch devices 100.

Figure 16:
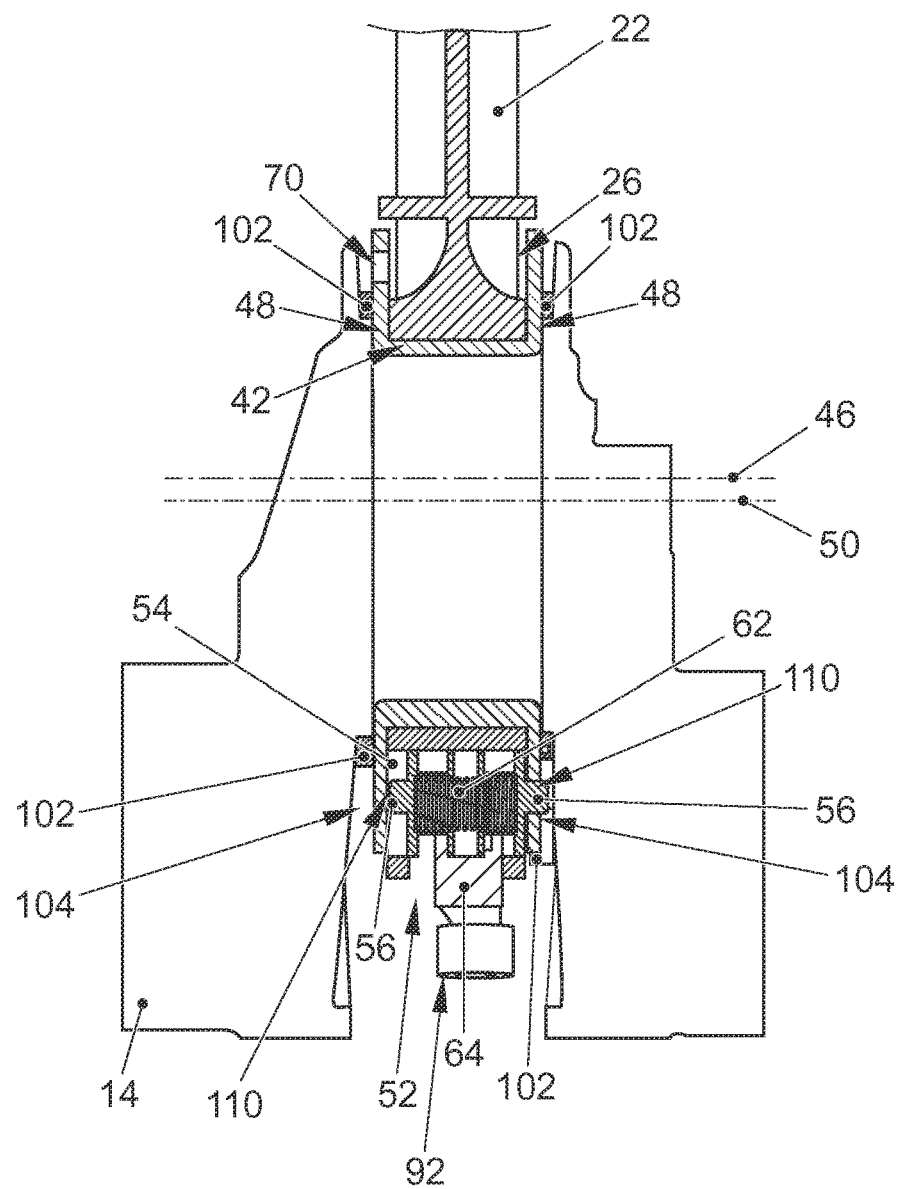
FIG. 16 the detail denoted by XVI in FIG. 15, in an enlarged and partially sectional illustration.

Also in this internal combustion engine, two clutch devices 100 acting with friction are provided, which each have a clutch element 102 which is resiliently loaded in a position which closes the respective clutch device 100 and therefore couples the eccentric sleeve 40 to a rotational movement of the crankshaft 14. Whilst, in the embodiment according to FIGS. 1 to 13, clutch elements 102 are provided which are loaded by separately prestressed spring elements 108, the clutch elements 102 in the embodiment according to FIGS. 14 to 17 is designed to be resiliently deflectable itself. Specifically, these are each designed in the form of a helical spring, whereof one end engages in an opening in the associated delimiting wall of the eccentric sleeve 40 and is thus positionally secured, and which, starting from this end, is guided through more than 360°, and specifically through ca. 450°, around the bearing opening for the associated crank pin 30 of the crankshaft 14, which bearing opening is formed by the eccentric sleeve 40. The second end of each of the helical spring-shaped clutch elements 102 has an angled design and is supported by this angled portion at the edge of the associated delimiting portion 48 of the eccentric sleeve 40. In this case, the geometry of the helical spring-shaped clutch elements 102 is selected such that they are resiliently expanded and therefore prestressed when the angled ends abut against the edges of the delimiting portions 48, which results in the clutch element 102 attempting to coil up more tightly or to a smaller diameter. This results in a constructive resilient loading of the clutch elements 102, because they thus move automatically into the clutch gap 104 (c.f. FIG. 16) which, in this embodiment of the clutch devices 100, narrows radially inwards, and thus induce a frictional coupling of the eccentric sleeve 40 to the crank cheeks 34 if they are not radially expanded as a result of striking against stop elements 110 and therefore the friction between the clutch elements 102 and the clutch surfaces of the crank cheeks 34 and the eccentric sleeve 40 is eliminated.

Figure 18:
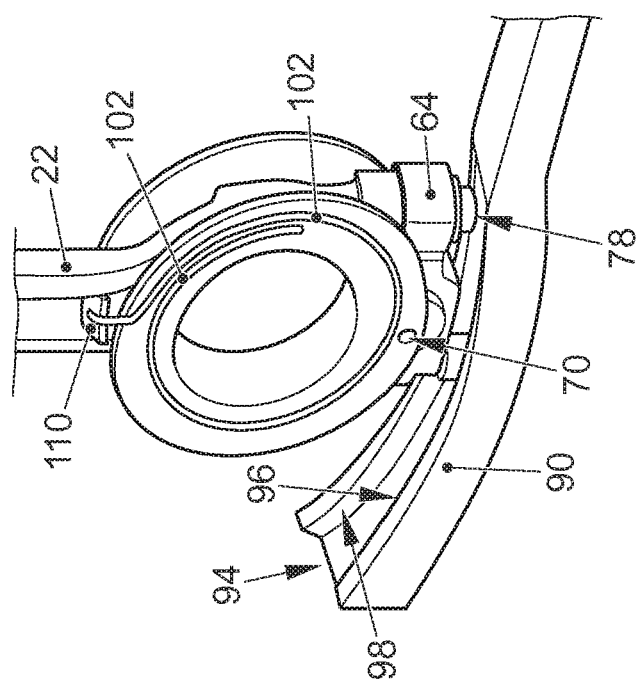
FIG. 18 the components according to FIG. 17 in a further perspective view.
Figure 17:
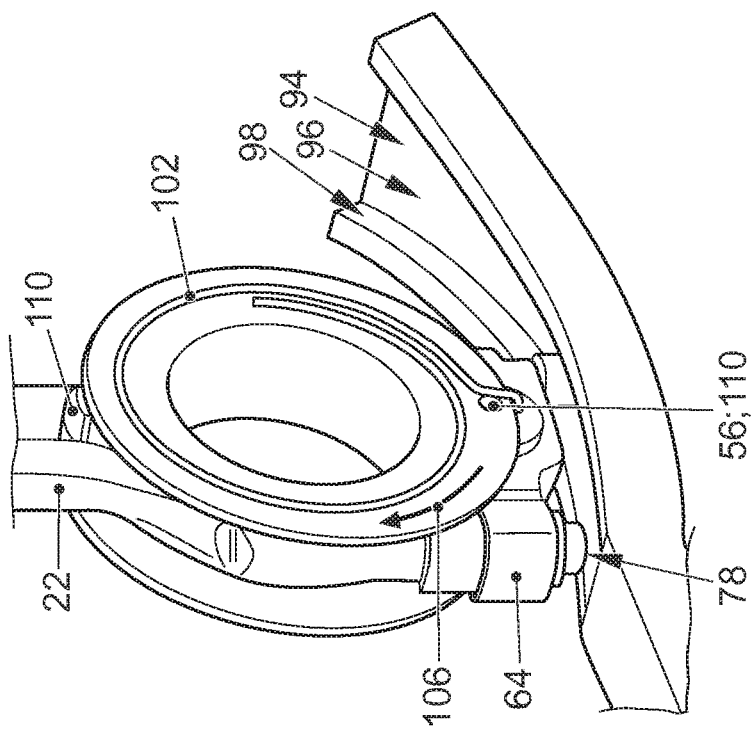
FIG. 17 in an isolated illustration, parts of the shift device and adjoining components of the internal combustion engine according to FIG. 14 in a perspective view.

A further difference of the internal combustion engine according to FIGS. 14 to 18 from that according to FIGS. 1 to 13 consists in that the activatable and deactivatable stop elements 110, of which one acts on of the clutch elements in, in each case, one of the two rotational alignments of the eccentric sleeve 40 which may be locked by means of the locking device 52, whilst the other clutch element 102 is simultaneously radially expanded as a result of contact with a passive stop element 110 (c.f. FIG. 18), are not formed by the actuating element 64 but by the respective locking element 56. To this end, it is provided that the corresponding locking element 56, which also engages in the associated locking depression 70 of the eccentric sleeve 40, projects through the locking depression 70 formed as a through-opening in the corresponding delimiting portion 48 of the eccentric sleeve 40 and into the associated coupling gap 104 to the extent that, when the corresponding rotational alignment of the eccentric sleeve 40 is achieved, that end of the corresponding clutch element 102 which is supported at the edge of the corresponding delimiting portion 48 when the clutch devices 100 are closed, and therefore upon a driving of the eccentric sleeve 40 by the crankshaft 14, runs onto that part of the corresponding locking element 56 which projects into the clutch gap 104 and is thus radially expanded (c.f. FIG. 17). The corresponding end of the other clutch element 102 simultaneously runs onto the outer side of the associated passive stop element 110 and is likewise expanded. Therefore, both clutch devices 100 are open and the friction between the clutch elements 102 connected with form fit to the eccentric sleeve 40 and the crank cheeks 34 of the crank shaft 14 is substantially suspended.

If, starting from such a starting position in which the internal combustion engine is operated with a constant compression ratio, the actuating element is switched by means of the actuating rail 90 according to the procedure for the internal combustion engine according to FIGS. 1 to 13, the locking element 56 located in a latching position is in turn firstly moved into a release position. The clutch element 102 which is no longer expanded by this locking element 56 then induces—initially on its own—a driving of the eccentric sleeve 40 by the crank shaft 14, whereby, in a first, relatively small portion of the rotation of the eccentric sleeve 40 relative to the connecting-rod big end 26, the second clutch element 102 is also moved out of engagement with the passive stop element 110. This second clutch element 102 then likewise couples the eccentric sleeve 40 with friction to the associated crank cheek 34 of the crankshaft 14. The second locking element 56, which then engages in the associated locking depression 70 upon achieving the other rotational alignment of the eccentric sleeve 40, then expands the associated clutch element 102 whilst the other clutch element 102 is expanded by the associated passive stop element 110 so that both clutch devices 100 are then in turn open.

LIST OF REFERENCE SIGNS

10 Engine block
12 Cylinder
14 Crankshaft/drive element
16 Crankshaft chamber
18 Piston
20 Longitudinal axis of the cylinder/piston
22 Connecting rod/second element
24 Piston pin
26 Connecting-rod big end
28 Axis of rotation of the crankshaft
30 Crank pin
32 Bearing portion of the crankshaft
34 Crank cheeks
36 Compensating mass of the crankshaft
38 Connecting-rod small end
40 Eccentric sleeve/driven element/first element
42 Bearing portion of the eccentric sleeve
44 Axis of rotation of the connecting-rod small end
46 Axis of rotation of the cylindrical inner surface of the eccentric sleeve
48 Delimiting portion of the eccentric sleeve
50 Longitudinal axis of the connecting-rod big end/axis of rotation of the cylindrical outer surface of the eccentric sleeve
52 Locking device
54 Receiving opening of the connecting rod
56 Locking element
58 Connecting-rod shaft
60 Longitudinal axis of the connecting rod
62 Spring element of the locking device
64 Actuating element
66 Driver projection of the actuating element
68 Driver groove of the locking element
70 Locking depression
72 Pivot axis of the actuating element
74 Connecting-rod base body
76 Connecting-rod cover
78 Screw connection between the connecting-rod base body and the connecting-rod cover
80 Securing detent
82 Spring element of the securing detent
84 Detent ball of the securing detent
86 Detent depression of the securing detent
88 Web of the securing detent
90 Actuating rail
92 Guide element of the actuating element
94 Guide groove of the actuating rail
96 Groove base of the guide groove
98 Guide surfaces of the guide groove
100 Clutch device
102 Clutch element
104 Clutch gap
106 Direction of rotation of the eccentric sleeve relative to the crank cheeks
108 Spring element of the clutch device
110 Stop element
112 Return blocking element
114 Spring element for the return blocking element
116 Separating plane between the parts of the eccentric sleeve
118 Guide opening for the spring element of the clutch device

The invention claimed is:

1. A clutch device for a demand-actuated transmission of a torque between a drive element, which is rotatable about a first axis of rotation, and a driven element, which is rotatable about a second axis of rotation, the clutch device comprising:
   each of the drive element and the driven element being formed with a clutch surface disposed to form a clutch gap with a gap width that decreases in a radial direction with respect to at least one of the first and second axes of rotation;
   a clutch element for coupling the drive element and the driven element to one another by friction;
   said clutch element being formed with contact surfaces for contacting said clutch surfaces, and said clutch element being movably disposed to be brought into a first position and a second position that differ in terms of a radial position of said clutch element within said clutch gap and in terms of a contact pressure between said contact surfaces of said clutch element and said clutch surfaces.

2. The clutch device according to claim 1, comprising means for resiliently loading said clutch element.

3. The clutch device according to claim 1, configured to be a self-energizing device.

4. The clutch device according to claim 1, wherein said clutch element assumes the first position in a state in which the clutch device is not resiliently loaded or as a result of a constructive resilient loading, while the second position is selectively set by an active setting device.

5. The clutch device according to claim 4, wherein said setting device comprises an adjustable stop element for said clutch element.

6. The clutch device according to claim 5, wherein said stop element is selectively activated and deactivated, and wherein said stop element forms a stop for said clutch element in an activated state and does not form a stop for said clutch element in a deactivated state.

7. The clutch device according to claim 1, wherein the first position is characterized by contact pressure that is higher than a contact pressure characterizing the second position.

8. The clutch device according to claim 1, wherein said clutch element is formed with clutch surfaces that are aligned parallel to said clutch surfaces of said drive element and said driven element.

9. A shift device, comprising:
the clutch device according to claim 1;
a first element and a second element to be positioned in at least one rotational alignment relative to one another;
said first element serving as the driven element of the clutch device which, when the clutch device is closed, may be rotated into rotational alignment relative to said second element by the drive element of the clutch device, and wherein the clutch device may be released when the rotational alignment is achieved.

10. The shift device according to claim 9, further comprising a locking element for a form-fitting connection, securing the rotational alignment, between said first element and said second element.

11. The shift device according to claim 10, wherein the clutch element of said clutch device assumes the first position in a state in which the clutch device is not resiliently loaded or as a result of a constructive resilient loading, while the second position is selectively set by an active setting device that includes an adjustable stop element for said clutch element, and wherein said locking element serves as a stop element of said clutch device.

12. The shift device according to claim 9, wherein said clutch device is one of at least two said clutch devices including a first clutch device and a second clutch device, wherein said clutch element assumes the first position in a state in which the respective clutch device is not resiliently loaded or as a result of a constructive resilient loading, wherein the second position of the clutch element of said first clutch device may be set in a first rotational alignment of the first element relative to the second element by way of a setting device and the second position of the clutch element of said second clutch device may be set in a second rotational alignment of the first element relative to the second element by way of the setting device.

13. The shift device according to claim 12, wherein each of said first and second clutch devices comprises a locking element for a form-fitting connection, securing the rotational alignment, between said first element and said second element, and which comprises a common actuating element configured to alternately actuate said locking element of said first clutch device and said locking element of said second clutch device.

14. The shift device according to claim 13, wherein:
in the first rotational alignment of said first element relative to said second element, in which the second position of said clutch element of said first clutch device is set by way of the setting device, the second position of the clutch element of the second clutch device is set by way of a passive setting element; and
in the second rotational alignment of said first element relative to said second element, in which the second position of said clutch element of said second clutch device is set by way of the setting device, the second position of said clutch element of said first clutch device is set by way of the passive setting element.

15. The shift device according to claim 13, wherein:
in the first rotational alignment of said first element relative to said second element, said locking element of said second clutch device is held in a release position by way of said actuating element, while said locking element of said first clutch device is loaded in a locking position by way of a spring element supported between said locking elements; and
in the second rotational alignment of said first element relative to said second element, said locking element of said first clutch device is held in a release position by way of said actuating element, while said locking element of said second clutch device is loaded in a locking position by way of said spring element.

* * * * *